(12) United States Patent
Eijkelenberg

(10) Patent No.: US 7,587,863 B2
(45) Date of Patent: Sep. 15, 2009

(54) SEAL FOR SANITARY OVERPRESSURE VENT STRUCTURE

(75) Inventor: Tom Eijkelenberg, Westerlo (BE)

(73) Assignee: Fike Corporation, Blue Springs, MO (US)

( * ) Notice: Subject to any disclaimer, the term of this patent is extended or adjusted under 35 U.S.C. 154(b) by 266 days.

(21) Appl. No.: 11/465,362

(22) Filed: Aug. 17, 2006

(65) Prior Publication Data

US 2008/0061517 A1 Mar. 13, 2008

(51) Int. Cl.
*E04B 1/00* (2006.01)
*F16J 15/02* (2006.01)

(52) U.S. Cl. .............................. 52/99; 277/644; 277/648

(58) Field of Classification Search ................. 52/1, 52/99, 100; 277/637, 644, 647, 648, 641, 277/928, 921; 137/68.23; 220/89.1; 49/475.1, 49/490.1

See application file for complete search history.

(56) References Cited

U.S. PATENT DOCUMENTS

| | | | | |
|---|---|---|---|---|
| 4,894,972 A * | 1/1990 | Endoh et al. | ............. | 52/717.01 |
| 5,311,711 A * | 5/1994 | Desir, Sr. | ................... | 52/208 |
| 5,355,651 A * | 10/1994 | Correia | .................... | 52/716.7 |
| 5,915,780 A * | 6/1999 | Kobrehel et al. | ........ | 296/146.15 |
| 5,935,356 A * | 8/1999 | Soldner | ........................ | 156/71 |
| 6,022,065 A * | 2/2000 | Stopp et al. | ............. | 296/146.15 |
| 6,134,851 A * | 10/2000 | Roze et al. | ............. | 52/204.597 |
| 6,546,682 B1 * | 4/2003 | DeBlock et al. | ........... | 52/204.72 |
| 6,810,635 B2 * | 11/2004 | Meizlish | ..................... | 52/716.5 |
| 6,902,224 B2 * | 6/2005 | Weinert et al. | ......... | 296/146.16 |
| 2003/0084625 A1 * | 5/2003 | Iguchi et al. | ................... | 52/208 |
| 2008/0041454 A1 * | 2/2008 | Eijkelenberg et al. | .... | 137/68.23 |
| 2008/0073860 A1 * | 3/2008 | Yamaguchi | ................. | 277/637 |

* cited by examiner

Primary Examiner—Richard E Chilcot, Jr.
Assistant Examiner—Mark R Wendell
(74) Attorney, Agent, or Firm—Hovey Williams LLP

(57) ABSTRACT

A one piece flexible sanitary seal 16 of uniform cross-section is provided for over pressure vent structure that protects a confined space meeting hygienic standards. The seal 16 has an elongated body 38 provided with a central section 40, a C-shaped terminal end 42 having a main lug portion 46 and a secondary lug segment 48 that project away from each other with a cavity 50 therebetween, and a long tail portion 44 cooperating with the central section 40 to present a longitudinally extending angular groove 62. The seal 16 is adapted to be mounted between a vent membrane unit 14 and a frame component 18 of the vent structure. Lug portion 46 and lug segment 48 sealingly engage the inner surface of the vent membrane 14 inboard of a line of weakness therein defined by a series of slots. A rectangular projection 52 extends from the central section 40 in disposition to engage the vent membrane unit 14, outboard of the line of weakness. The main lug portion 46 and the secondary lug segment 48 of terminal end 42 are moveable toward and away from one another while remaining in tight sealing engagement with the vent membrane unit 14 during in and out cycling thereof. Frame component 18 is received in the groove 62 to firmly affix the seal 16 to the vent structure.

30 Claims, 3 Drawing Sheets

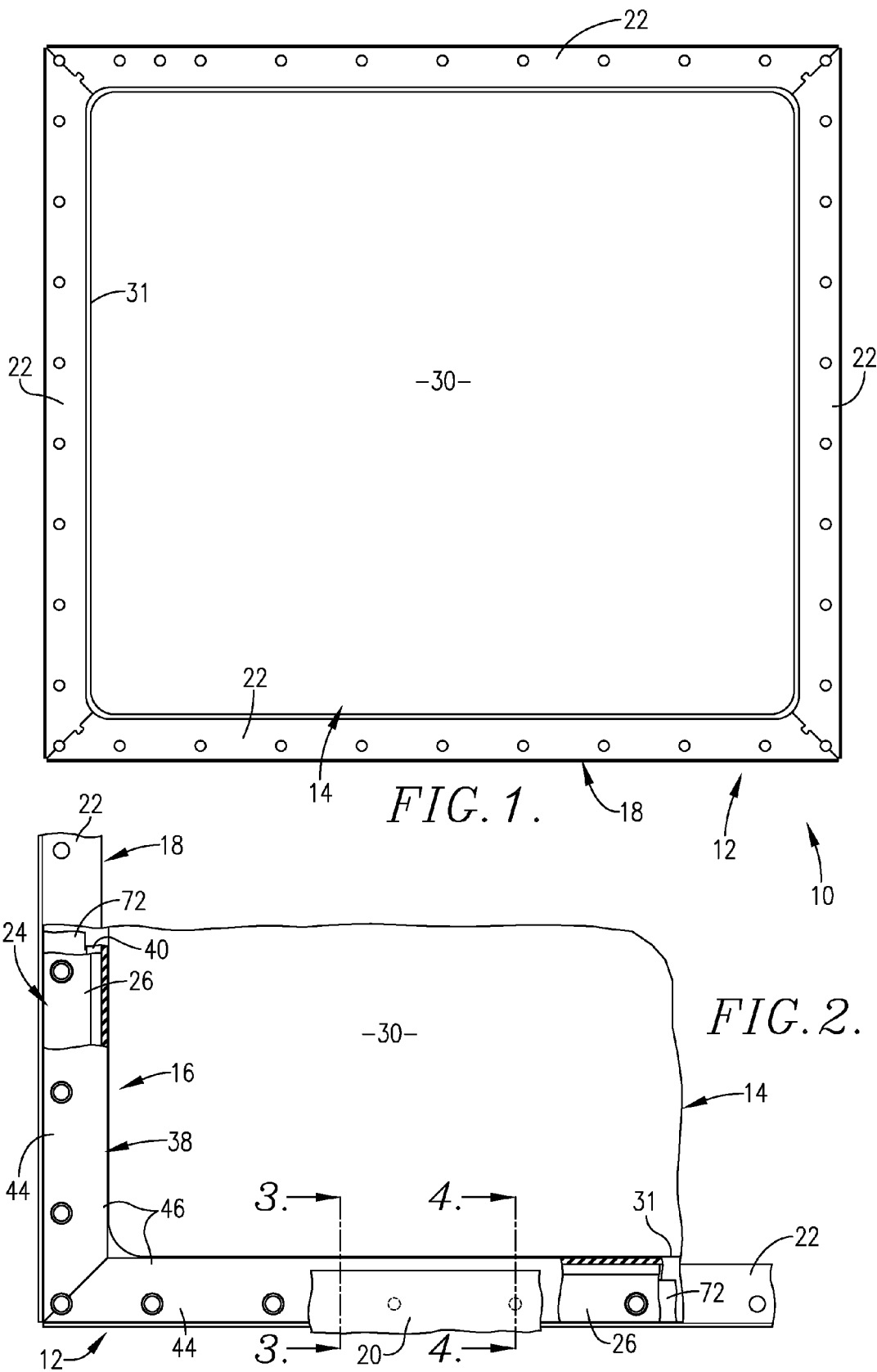

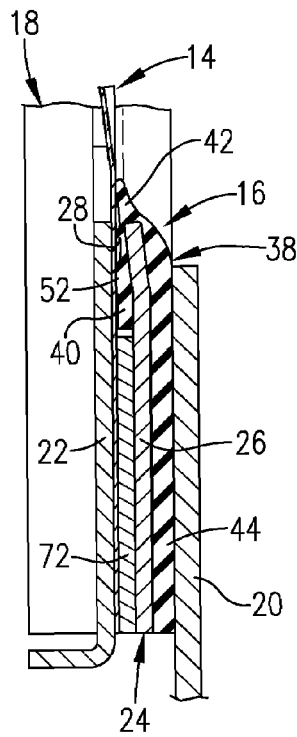
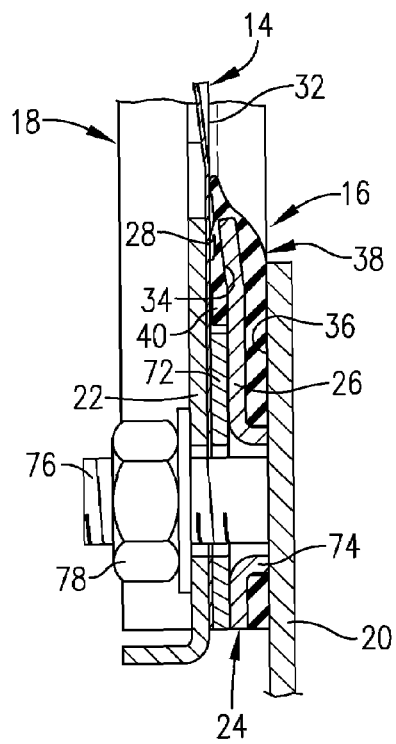
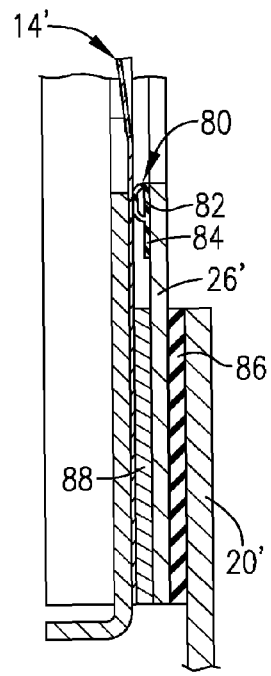
FIG.3.  FIG.4.  FIG.8.
PRIOR ART
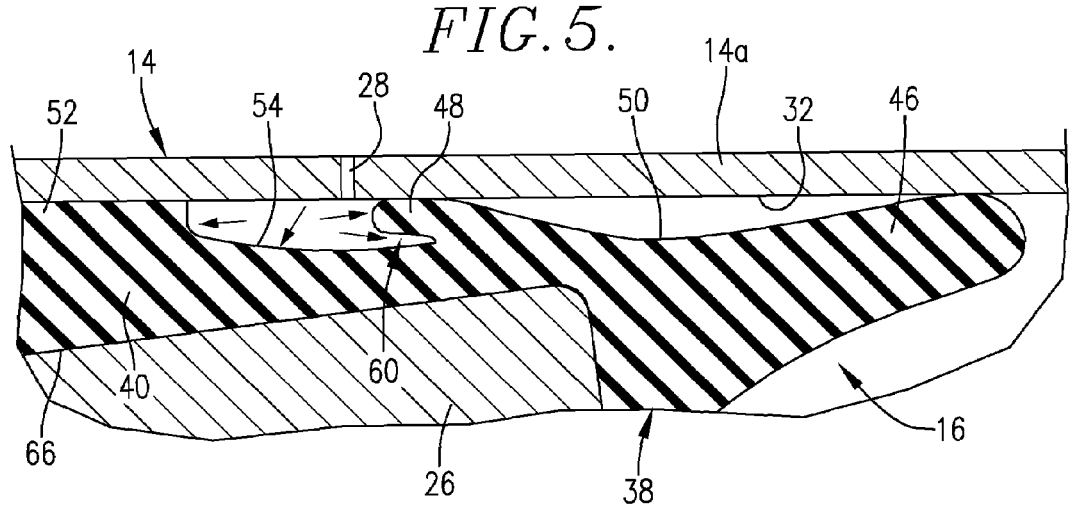
FIG.5.

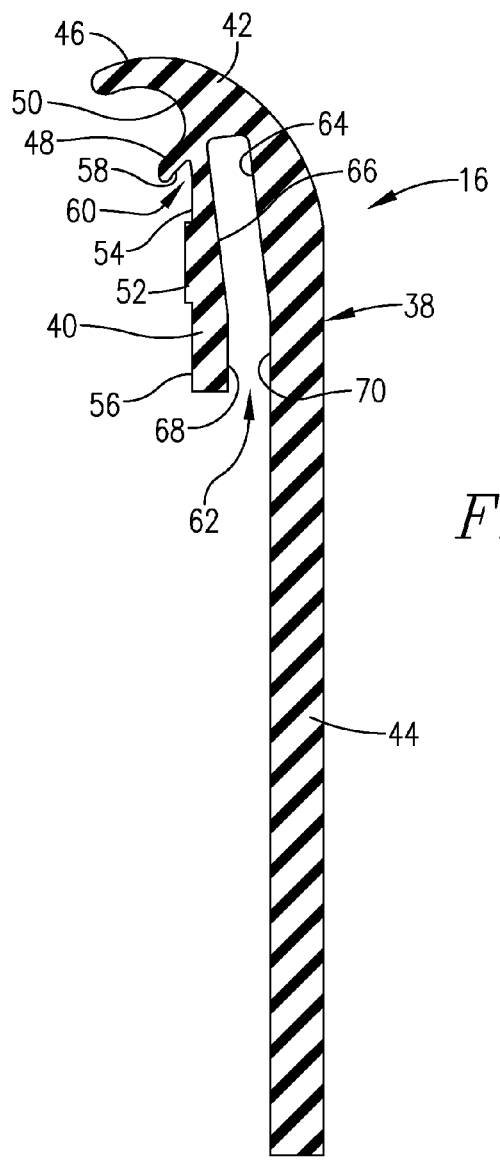
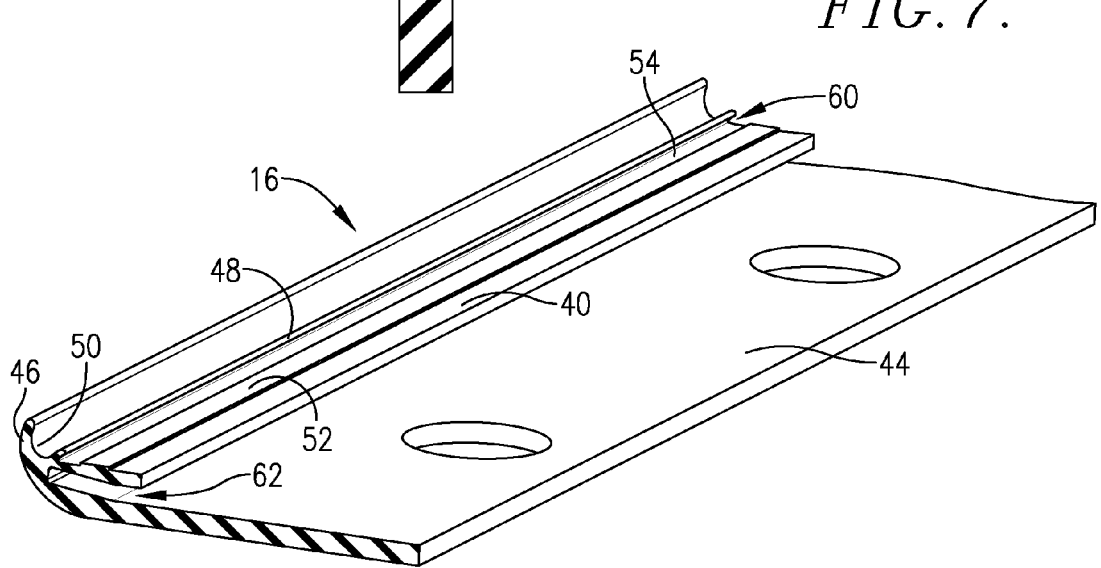

SEAL FOR SANITARY OVERPRESSURE VENT STRUCTURE

BACKGROUND OF THE INVENTION

1. Field of the Invention

This invention relates to an improved one-piece flexible seal for overpressure vent structure used to protect a confined space that meets regulated hygienic standards. The vent structure has a vent aperture for relief of high predetermined overpressure conditions. The pressure relieving apparatus has frame structure that supports a vent membrane unit provided with a series of slots defining a relief area of the vent membrane unit. The seal is adapted to be positioned between a frame member of the frame structure and a peripheral portion of the vent membrane unit. A single seal performs the dual function of preventing leakage of fluid between the frame member and the vent membrane unit while maintaining an effective seal during positive and negative pressure cycling of the vent membrane unit during use of the vent structure.

2. Description of the Prior Art

Explosion vents traditionally have been provided with a rupturable sheet of metal that has interrupted slots presenting a line of weakness defining the outline of the relief area of the vent. The amount of overpressure required to open the relief are of the vent is determined by, among other things, the type, thickness, and physical properties of the metal selected for fabrication of the explosion vent, the nature of the line of weakness, and the location of the line of weakness in the overall area of the vent. The thickness of the metal vent material is limited in certain instances by regulatory standards to no more than about 0.060 in. Furthermore, a thin layer of a thermoplastic polymeric material, such as fluorinated ethylene propylene (FEP), or an equivalent, such as PTFE or PFA, is provided in association with the metal material to cover the slots forming the line of weakness.

In those instances where the explosion vent is used to protect structures in industries where the processing equipment, conduits, vessels, and the like are necessarily operated under sanitary conditions, frequent hygienic cleaning, using a cleansing agent such as steam, is mandated by regulations and carried out in accordance with recognized procedures. It is conventional practice to provide a flexible seal between the vent membrane unit and supporting frame structure. It can be appreciated that in cleaning the processing equipment structures, it is essential that all residue remaining from a particular process be removed before equipment can be placed back in operation. It is especially difficult to displace and remove particulate materials from cracks and crevices in the components of the equipment being cleaned.

Very often, the vent apparatus is mounted in an operative upright position in the sidewall of processing apparatus or components thereof that are being protected from an overpressure condition. Accordingly, removal of particulate material that may collect along the lower edge of generally rectangular vent apparatus between a flexible seal and the lowermost frame member of the vent apparatus is especially difficult. This is particularly so when the seal employed is of typical transverse P-shape having a tubular segment that is unitary with a flat dependent skirt. Elongated seals of the P type are placed between a peripheral edge of the vent membrane and an opposed frame member of the vent apparatus frame structure, with the tubular segment being compressed between the vent and the frame member, while the skirt portion provides additional sealing surface between the process and the surrounding atmosphere.

Particulate material and the like generated by the process collects in the peripheral crevice formed between the vent membrane and the tubular portions of the P seal. In the case of a vertically mounted vent, a disproportionate portion of residual processing particulate material tends to collect in the lowermost horizontal crevice between the tubular P seal and the vent membrane unit and the adjacent upright corners of the P seal, than is the case of the remaining crevice between the P seal and the support frame structure. Removing particulate material that has lodged in the lowermost horizontal crevice between the P seal and the support frame structure, even with high pressure steam ejection cleaning equipment, is particularly difficult. Not only is it time-consuming to attempt removal of all of the residual particulate material residing in the crevices between the P seal and the vent frame structure, but often times, as a practical matter, steam dislodgement of the residual particulate material is not, in fact, totally effective.

Therefore, there is a long-existing, unsolved need for an improved seal to be interposed between the periphery of a vent membrane and supporting frame structure that is especially useful for sanitary processing equipment in which cleaning of the vent structure may be more effectively accomplished in a shorter period of time than in the past where P-type seals have conventionally been employed.

SUMMARY OF THE INVENTION

This invention relates to an improved seal for conventional hygienic overpressure-relieving apparatus having frame structure supporting the edge portion of a vent membrane unit operable to relieve a predetermined overpressure condition. A typical vent membrane unit has a series of line of weakness-defining slots adjacent the frame defining the outline of a relief area of the vent membrane unit. The seal is adapted to be positioned between the vent membrane unit and a surface of the frame structure in sealing relationship thereto.

The seal comprises an elongated, flexible, one-piece body of uniform configuration throughout its length and provided with a central section, a terminal end portion, and a tail portion. The central section of the seal is configured to be located in generally aligned relationship with the line of weakness-defining slots in the vent membrane unit when the seal is installed between the vent membrane unit and an adjacent frame structure surface. The terminal end portion of the seal is of substantially C shape and has an outer leg defining a main lug portion unitary with the central section of the seal body that projects therefrom in a direction to sealingly engage the vent membrane unit inwardly of the line of weakness with respect to the frame structure. The other leg of the C-shaped terminal end portion of the seal presents a secondary lug segment that is also unitary with the central section of the seal. The secondary leg segment is configured and disposed to engage the vent membrane unit outboard of the main lug portion, and inboard of the line of weakness of the vent membrane unit in the installed position of the seal. When installed, the area of the terminal end portion of the seal between the main lug portion and the secondary leg segment defines a longitudinally extending cavity between the main lug portion and the secondary leg segment facing the vent membrane unit. Thus, the main lug portion and the secondary lug segment are free to move relatively toward and away from each other in opposite directions as the cavity therebetween increases and decreases in size. This relative movement permits the main lug portion and secondary lug segment to remain in sealing engagement with the vent membrane unit as the latter cycles in and out during use of the apparatus. In fact, the C-shape of the terminal end portion of the seal and the relative position and length of the main lug portion thereof causes the main lug portion in the installed condition of the seal to flex to an extent that the tight seal between the outer edge of the main lug portion and the proximal surface of the main lug portion increases to a certain extent during inward displacement of the vent membrane unit under a vacuum existing in the protected area the structure.

The central section of the seal body has an elongated projection situated to engage the vent membrane unit outboard of the line of weakness therein in the installed position of the seal. The projection and the secondary lug segment cooperate to define a second longitudinally extending cavity facing the vent unit in the installed position of the seal. The secondary leg segment extends toward the projection thus defining an undercut area of the secondary leg segment that faces toward the second cavity. The secondary leg segment of the seal, when in engagement with vent membrane unit, is deformed to an extent to decrease the effective area of the secondary leg segment undercut area. Because the second cavity is generally aligned with the line of weakness slots in the vent membrane unit, when the vent membrane unit moves inwardly as the result of a vacuum condition in the protected area, an increase of air pressure in the second cavity and thereby in the undercut area occurs thereby causes the secondary lug segment to be forced into tighter sealing relationship with the vent membrane unit.

The elongated projection on the central section of the seal also is compressed to a degree such that when in engagement with the vent membrane unit its sealing relationship with the vent membrane unit is maintained during in and out excursions of the vent membrane unit under variable pressure cycling of the overpressure relieving apparatus.

The outermost face of the main lug of the C-shaped terminal end portion of the seal in its installed position presents a relatively smooth surface with only a narrow edge facing the process side of the overpressure relieving apparatus that would tend to collect process particles, especially the lowermost horizontal part thereof when the apparatus is disposed in a frequently used upright position. Accordingly, cleaning of the seal in an upright position of the apparatus is substantially easier and more effective and efficient than has been the case in the past when a conventional P seal has been employed.

Furthermore, the seal of this invention serves as a single replacement for two separate seals required in the past—a P seal isolating the overpressure relief apparatus from the surrounding atmosphere and a flat process seal between the protected area and the overpressure relieving apparatus.

BRIEF DESCRIPTION OF THE DRAWINGS

FIG. 1 is a plan view of sanitary overpressure relieving apparatus having frame structure supporting a vent membrane unit adapted to open under a predetermined overpressure and that includes an improved seal adapted to be positioned between the vent membrane unit and one of the frame structure surfaces in sealing relationship thereto;

FIG. 2 is a is a fragmentary, enlarged, rear elevational view of the overpressure relieving apparatus of FIG. 1 with parts being broken away for clarity;

FIG. 3 is a vertical cross-sectional view along the line 3-3 of FIG. 2, looking in the direction of the arrows, with the seal being shown on a scale approximately 1.25 actual size;

FIG. 4 is a vertical cross-sectional view along the line 4-4 of FIG. 2, again looking in the direction of the arrows, and on the same scale as FIG. 3;

FIG. 5 is a fragmentary, enlarged, cross-sectional view approximately along the line 3-3 of FIG. 2, with the seal being shown on a scale that is approximately 10× the scale of the seal as shown in FIGS. 3 and 4;

FIG. 6 is a vertical, cross-sectional view of the seal on a scale approximately 3× actual size of the seal;

FIG. 7 is a fragmentary perspective view of the seal as shown in FIG. 6; and

FIG. 8 is a cross-sectional view of prior art sanitary pressure relieving apparatus on approximately the same scale as FIGS. 3 and 4 and illustrating a conventional P-shaped seal between the vent membrane unit and frame structure, along with a second planar seal between the frame components and the structure protected from an overpressure.

DETAILED DESCRIPTION OF THE PREFERRED EMBODIMENT

Overpressure relieving apparatus 10, as depicted in FIG. 1, includes what may be conventional frame structure 12 supporting a typical vent membrane unit 14, for relieving an overpressure such as an explosion or a fast-burning fire that may occur in an area protected by apparatus 10. The improved seal 16 of this invention is adapted to be interposed between a peripheral portion of vent membrane unit 14 and an opposed surface of frame component 18 forming a part of structure 12. The frame structure 12, which is exemplary of frame structure that is mounted on a surface such as the wall 20 (FIGS. 3 and 4) of an area requiring protection from an explosion or high pressure products of combustion generated by a fire or the like.

The frame component 18 of frame structure 12 may include four generally planar outer frame members 22 that are joined at their corners to form a rectangle, with each of the frame members 22 being fabricated from either non-stainless or stainless steel. The backside of frame structure 12 has a rectangular frame component 24 also formed from four generally planar frame elements 26 that are joined at the corners of the rectangle. It is to be observed from FIGS. 1-4, that the frame members 22 of frame component 18, and the frame elements 26 of frame component 24 are of similar cross-sectional widths.

The vent membrane unit 14 generally includes a pair of relatively thin metal burst panels having a series of elongated spaced slots 28 extending therethrough that cooperate to define a U-shaped line of weakness presenting a hinge area of the sheets opposite the bight portion of the line of weakness. A thin layer of polymeric material between the panels serves to cover the slots defining the line of weakness in vent membrane unit 14.

In an exemplary vent membrane unit, the thin metal panels may be fabricated of materials such as stainless steel, Inconel, titanium, nickel, or Hastelloy, having a thickness of from about 0.05 to about 3 mm, and usually about 0.5 mm. The thin polymeric layer between the metal panels may, for example, be fluorinated ethylene propylene (FEP), or alternatively, polytetrafluoroethylene (PTFE), or equivalent polymers, having a thickness of from about 0.0125 mm to about 0.30 mm and preferably about 0.250 mm. Those skilled in the art of manufacturing explosion vents are well-versed in choosing the type of metal, the specific thickness of the metal panels making up vent membrane unit 14, the length of the slots 28 forming the line of weakness in vent membrane unit 14, and the spacing between adjacent slots 28 of vent membrane unit 14, in order to assure that the central pressure relief area 30 of vent membrane unit 14 bursts and opens, while folding back about the hinge area thereof, to relieve a predetermined overpressure condition in the protected area. The specific burst pressure parameters of a particular vent membrane unit design are usually based on information derived from prior products, as well as iterative empirical processes. The panels of vent membrane unit 14 may be bulged outwardly to a limited degree about rectangular transition line 31, shown best in FIG. 1.

The sanitary seal 16 that is adapted to be interposed between the surface 32 of vent membrane unit 14 and the proximal, facing surface 34 of frame element 26, as well as the adjacent surface 36 of protected area wall 20, is illustrated in its uninstalled configuration in the enlargement thereof in FIG. 6. Seal 16 is preferably an elongated, flexible, one-piece body 38 formed of synthetic resin polymeric material. Body 38 may be formed from a material such as white (clear) silicone rubber or a polyurethane polymeric material. The body 38, making up seal 16, is of uniform cross-sectional configuration permitting fabrication of the seal 16 by an extrusion process. The body 38 has a Shore A durometer value of from about 10 to about 80, and preferably about 62.

Body 38 of seal 16 has a central section 40, a terminal end portion 42, and a tail portion 44. The terminal end portion 42 of seal body 38, is of substantially C-shaped configuration transversely thereof having two legs, one presenting an outermost main lug portion 46 while the second leg defines a secondary lug segment 48. The two legs project away from each other in opposite directions. The area between main leg portion 46 and the secondary leg segment is of concave configuration as can be observed from FIG. 6 presenting a continuous, longitudinally extending cavity 50. The main lug portion 46 of central section 40 is of substantially greater length and thickness than the secondary lug segment 48.

Central section 40 is provided with an elongated, unitary, transversely-rectangular projection 52 spaced from secondary lug segment 48. Projection 52, extending outwardly from central section 40, cooperates with secondary lug segment 48 to define a second longitudinally-extending, continuous cavity 54 therebetween. It is to be seen that the outermost planar surface 56 of central section 40 is inboard of, and therefore at a different elevation than, the outer planar surface of projection 52. The secondary lug segment 48 is provided with inwardly-extending surfaces 58 presenting an undercut area 60 communicating with cavity 54 and facing projection 52.

The tail portion 44 of seal body 38 is of substantially greater length than central section 40 and cooperates with the latter to present a continuous longitudinally-extending groove 62. The innermost portion of groove 62 is defined by two opposed parallel surfaces 64 and 66 that are spaced from one another and located at an angle with respect to opposed outermost surfaces 68 and 70 of groove 62. The angularity of inner surfaces 64 and 66 with respect to outer surfaces 68 and 70, is preferably about 7°.

The seal 16 is especially configured to be mounted between vent membrane unit 14 and the frame element 26, in disposition overlying wall 20, as best shown in FIGS. 3-5. The groove 62 of seal 16 complementally receives frame element 26. The angularity of the innermost part of the groove 62 defined by opposed surfaces 64 and 66 functions as a mechanical lock to minimize possible slippage of the seal 16 with respect to the frame structure 12, and thereby contributes to retention of seal 16 in its installed position during cyclic flexing of vent membrane unit 14 in the operation of apparatus 10. A rectangular metallic spacer 72, between frame element 26 and vent membrane unit 14, is of a thickness substantially equal to the thickness of central section 40 of body 38 between surfaces 56 and 68.

Upon installation of seal 16, the main lug portion 46 is of a length and positioned to be deflected inwardly into tight sealing engagement with the inner face of vent membrane unit 14, as shown in FIG. 5. Similarly, the secondary leg segment 48 is of a length and disposed to be deflected outwardly into tight sealing engagement with the inner face of vent membrane unit 14. The cavity 50 between main lug portion 46 and secondary lug segment 48 faces vent membrane unit 14. It is to be seen from FIGS. 4 and 5, for example, that in the installed position of seal 16 cavity 50 is of less radius than in the uninstalled condition of seal 16, as depicted in FIG. 6. The secondary lug segment, which is inboard of the line of weakness-defining slots 28, is somewhat compressed, thereby reducing the size, but not eliminating, undercut area 60.

The frame element 26 has a series of annular flanges 74 projecting away from vent membrane unit 14 that serve to receive respective threaded studs 76 carried by wall 20. The studs 76 extend through frame elements 26, spacers 72, and frame members 22. Nuts 78 on respective studs 76 releasably affix frame structure 12 with the seal 16 interposed therein, to wall 20. The flanges 74 are each of a length to assure that tail portion 44 of seal body 38 is in effective sealing engagement with wall 20 while precluding excessive compression of tail portion 44.

FIG. 8 is a cross-sectional depiction of prior sanitary seal structure employing a conventional P-seal 80 between vent membrane unit 14' and a frame element 26'. P-seal 80 typically included a tubular section 82 unitary with a flat dependent skirt portion 84. The tubular section 82 of P-seal 80 was disposed against an adjacent face of vent membrane unit 14', while the other surface of P-seal 80 was positioned against frame element 26'. A rectangular spacer 88, similar to spacer 72, was usually provided to limit the degree of compression of tubular section 82 of P-seal 80. When using a P-seal, such as 80, it was also necessary to have another rectangular flat gasket 86 positioned between frame element 26' and the process wall 20' for sealing the overpressure-relieving apparatus 10 from the process. Accordingly, utilization of a seal such as a P-seal 80, required the use of two seals, P-seal 80 and gasket 86, versus the single seal 16 of the present invention.

In operation, seal 16, when installed in overpressure-relieving apparatus 10, has been found to provide a leak-proof seal even though the vent membrane unit undergoes cyclic in and out deformations as much as 3-4 mm. During substantial inward deflection of the pressure relief area 14a of vent membrane unit 14, under a vacuum for example, of the order of at least 3-4 mm, the pressure relief portion 14a of vent membrane unit 14 is deflected inwardly by the pressure relief portion of the vent membrane unit 14, thereby exerting pressure on the surface of main lug portion 46 and causing the main lug portion 46 to move toward the membrane unit 14 producing even tighter engagement of main lug portion 46 with the opposed inner face of vent membrane unit 14. Such inward cycling of the central part of the vent membrane unit 14 causes the main lug portion 46 and the secondary lug segment 48 to both be deflected outwardly in opposite directions away from one another to a certain extent, thus increasing the sealing force of secondary lug segment 48 with the interface of vent membrane unit 14 concomitantly with increase of the sealing force of main lug portion 46 with the opposed surface of vent membrane 14. Of particular significance is the fact that the sealing forces of main lug portion 46 and secondary lug segment 48 against the surface of vent membrane unit are self-compensating, with the degree of seal in both instances increasing and decreasing with the extent of deflection of the vent membrane unit 14. The greater the degree of deflection of the vent membrane unit 14, the greater the propensity for a leak to occur between the seal and the process. However, during further inward movement of the vent membrane unit 14, the sealing pressure of main lug portion 46 correspondingly increases against the inner surface of the vent membrane unit 14, thus assuring a leak-proof seal under varying cyclic operating conditions.

As is best shown in FIG. 5, when the vent membrane unit 14 is caused to move inwardly under increased vacuum conditions in the protected area, there is a pressure increase in cavity 54 whereby such pressure increase in undercut area 60 causes an upward force on secondary lug element 48, thereby increasing the sealing force of secondary lug element 48 with the opposed face of vent membrane unit 14. During cyclic excursions of vent membrane unit 14, the main lug portion 46 and secondary lug segment 48 both effect tighter seals against the vent membrane unit, as the main lug portion 46 and secondary lug segment 48 move toward and away from one another. Such opposite movement is accommodated by the increase and decrease of the corresponding increase and decrease of the size of cavity area 50. The extent of compression of projection 52 during cycling of vent membrane unit 14 also varies with the extent of in and out movement of the vent membrane unit. Therefore, projection 52 provides further compensation for cycling of the vent membrane unit to improve the leak-proof characteristics of seal 16. The fact that there is space on opposite sides of projection 52 allows the latter to compress and expand laterally in both directions and maintain sealing engagement with the opposed surface of vent membrane unit 14, substantially regardless of the degree of deflection of the vent membrane unit.

The reduced thickness of central section 40 of seal body 38 on opposite sides of projection 52 allows the projection to expand in opposite directions during compression thereof.

Therefore advantages of the present improved seal include:
Ingress of process product is precluded by covering of the line of weakness
A single seal fulfills the function of two gaskets as in past vent structures
There are only limited components in contact with the process
Performance is independent of operator installation and use—the annular flanges 74 prevent overtorquing of fasteners 76,78
The gasket spacer 26 forming a part of the frame structure 12 provides improves frame strength
The 7 degree bend of the angular portion of the groove defined by surfaces 64 and 66 of groove 62 offers a mechanical lock for seal 60 and minimizes the tendency of the seal to creep from its installed position
The seal shape and design prevents process product build up if the overpressure relieving apparatus is mounted vertically
The main sealing lug portion 46 provides leak proof sealing for vent membrane unit excursions of the order 3-4 mm
The secondary leg segment 48 of seal 16 forms a dual function—when compressed it applies more sealing force on the main lug portion 46 as the lug portion 46 and leg segment 48 move away from one another—provides optimum sealing properties for overpressure and vacuum respectively with vacuum pressure increasing the load on the leg segment 48.
Extended height of projection 52 allows the material to flow in opposite directions on compression of projection 52 under a vacuum condition.
The extended length tail portion 44 of seal 16 serves as a process connection sealing function.
The increased thickness of projection 52 also functions as a mechanical lock for seal 16.
The seal is of sufficient thickness adjacent to the innermost end of groove 62 to prevent premature failure of the seal.

I claim:

1. A seal for sanitary overpressure relieving apparatus having frame structure presenting opposed surfaces receiving the peripheral portion of a vent membrane unit therebetween wherein the vent membrane unit is provided with a series of slots adjacent the frame structure defining a relief area of the vent membrane unit, said seal adapted to be positioned between the vent membrane unit and one of the frame structure surfaces in sealing relationship thereto and comprising:

an elongated flexible one piece body having a main body section and a central section configured to be generally aligned with the relief area defining slots in the vent membrane unit when the seal is installed between the vent membrane unit and said one frame structure surface, a main lug portion unitary with the central section of the seal body and projecting therefrom in a direction to sealingly engage the vent membrane unit inwardly of the relief area defining slots with respect to the frame structure, a secondary lug segment unitary with the central section of the seal, spaced from the main lug portion, and located outboard of the main lug portion and inboard of the relief area defining slots in disposition to engage the vent membrane unit in the installed position of the seal, there being an elongated, longitudinally extending cavity in the central section of the seal body between the main lug portion and the secondary lug segment in facing relationship to the vent membrane unit, said main lug portion and the secondary lug segment each being of relative lengths and located in positions such that the main lug portion and the secondary lug segment are movable relatively toward and away from each other in opposite directions while remaining in tight sealing contact with the vent membrane unit in the installed position of the seal as the vent membrane unit cycles in and out during use of the apparatus.

2. A seal for sanitary overpressure relieving apparatus as set forth in claim 1, wherein said main lug portion is of substantially greater size and dimensions than said secondary lug segment.

3. A seal for sanitary over pressure relieving apparatus as set forth in claim 1, wherein said main lug portion is substantially thicker than said secondary lug segment.

4. A seal for sanitary overpressure relieving apparatus as set forth in claim 1, wherein said main lug portion and the secondary lug segment extend away from one another in opposite directions.

5. A seal for sanitary over pressure relieving apparatus as set forth in claim 1, wherein said main lug portion and the secondary lug segment of the seal body are located in relative positions such that movement of the vent membrane unit toward the central section of the seal body exerts sufficient pressure on the main lug portion of the central section of the seal body to move the secondary lug segment toward the vent membrane unit and into tighter contacting relationship therewith.

6. A seal for sanitary over pressure relieving apparatus as set forth in claim 1, wherein said central section of the seal body is provided with an elongated groove extending longitudinally of the seal body and oriented in a direction opening away from the main lug portion of the seal body for receiving an extension of the frame structure to releasably secure the seal body to the frame structure.

7. A seal for sanitary over pressure relieving apparatus as set forth in claim 6, wherein said groove has an innermost end and an outermost opening, said groove being located at an angle with respect to the main body section with the innermost extremity of the groove in closer relationship to the secondary lug segment than the distance of the outermost opening of the groove from the surface of the seal body in closest proximity to the vent membrane unit in the installed position of the seal.

8. A seal for sanitary over pressure relieving apparatus as set forth in claim 7, wherein the cross-sectional axis of said groove is at an angle of about 7° with respect to the surface of the seal body in closest proximity to the vent membrane unit in the installed position of the seal.

9. A seal for sanitary over pressure relieving apparatus as set forth in claim 1, wherein said central section of the seal has a, unitary, elongated, transversely extending projection situated to engage the vent membrane unit outboard of the relief area defining slots therein in the installed position of the of the seal.

10. A seal for sanitary over pressure relieving apparatus as set forth in claim 9, wherein there is provided an elongated, longitudinally extending cavity in the central section of the seal body between the projection and the secondary lug segment in disposition facing toward the vent membrane unit that thereby allows the projection to undergo compression as the vent membrane unit cycles in and out during use of the apparatus.

11. A seal for sanitary over pressure relieving apparatus as set forth in claim 1, wherein said seal body includes a unitary, elongated base portion extending transversely thereof in a direction away from the main lug portion and the secondary lug segment and adapted to underlie the frame structure in the installed position of the seal.

12. A seal for sanitary overpressure relieving apparatus having frame structure presenting opposed surfaces receiving the peripheral portion of a vent membrane unit therebetween wherein the vent membrane is provided with a series of slots adjacent the frame structure defining a relief area of the vent membrane unit, said seal adapted to be positioned between the vent membrane unit and one of the frame structure surfaces in sealing relationship thereto and comprising:
  an elongated flexible one piece body having a central section configured to be generally aligned with the relief area defining slots in the vent membrane unit when the seal is installed between the vent membrane unit and said one frame structure surface,
  a main lug portion unitary with the central section of the seal body and projecting therefrom in a direction to sealingly engage the vent membrane unit inwardly of the relief area defining slots with respect to the frame structure,
  a secondary lug segment unitary with the central section of the seal and located outboard of the main lug portion and inboard of the relief area defining slots in disposition to engage the vent membrane unit in the installed position of the seal,
  said central section of the seal having a unitary, elongated transversely extending projection situated to engage the vent membrane unit outboard of the relief area defining slots therein in the installed position of the seal,
  there being an elongated, longitudinally extending cavity in the central section of the seal body between the projection and the secondary lug segment in disposition facing toward the vent membrane unit that thereby allows the projection to undergo compression as the vent membrane unit cycles in and out during use of the apparatus.

13. A seal for sanitary over pressure relieving apparatus as set forth in claim 12, wherein is provided first and second elongated, longitudinally extending cavities in the central section of the seal on opposite sides of the projection that thereby allow the projection to undergo compression in opposite directions during cyclic in and out movement of the vent membrane unit.

14. A seal for sanitary overpressure relieving apparatus comprising:
  an elongated, flexible, one-piece body of uniform configuration throughout its length, said body being provided with a central section, a terminal end portion, and a tail portion,
  said terminal end portion being of substantially C-shaped configuration transversely thereof,
  wherein said C-shaped terminal end portion has an outer leg portion and an inner leg portion each provided with an end extremity,
  wherein said central section has an elongated, unitary, transversely extending projection thereon that is in spaced relationship from the terminal end portion,
  said projection and said inner leg portion end extremity cooperating to define a longitudinally-extending cavity therebetween.

15. A seal for sanitary overpressure relieving apparatus as set forth in claim 14, wherein said end extremity of the outer leg portion being of greater thickness than said end extremity of the inner leg portion.

16. A seal for sanitary overpressure relieving apparatus as set forth in claim 14, wherein said projection is of generally rectangular configuration.

17. A seal for sanitary overpressure relieving apparatus as set forth in claim 14, wherein said seal is provided with an elongated, longitudinally extending, transversely oriented groove between the central section and the terminal end portion.

18. A seal for sanitary overpressure relieving apparatus as set forth in claim 17, wherein said groove is located at angle with respect to the terminal end portion.

19. A seal for sanitary overpressure relieving apparatus as set forth in claim 18, wherein said angle is approximately 7°.

20. A seal for sanitary overpressure relieving apparatus as set forth in claim 17, wherein said terminal end portion is of substantially greater length transversely thereof than said central section of the seal.

21. A seal for sanitary overpressure relieving apparatus as set forth in claim 15, wherein said leg portions of the terminal end portion are oriented in disposition relative such that application of a force toward the innermost leg portion exerts a force on the outermost leg extending outwardly from the terminal end portion.

22. Sanitary overpressure relieving apparatus comprising:
  frame structure presenting opposing surfaces;
  a vent membrane unit having a peripheral edge portion received between the opposing surfaces of the frame structure,
  said vent membrane unit being provided with a series of slots adjacent the frame structure defining a relief area of the vent membrane unit;
  an elongated flexible one-piece seal mounted on the frame structure and having a central section configured and located in generally aligned relationship with the relief area defining slots in the vent membrane unit, said seal being provided with a main lug portion unitary with the central section of the seal body, and projecting therefrom into sealing engagement with the vent membrane unit inwardly of the relief area defining slots with respect to the frame structure, said seal further being provided with a secondary lug segment unitary with the central section of the seal and located outboard of the main lug portion and inboard of the relief area defining slots in disposition engaging the vent membrane unit, there being an elongated, longitudinally extending cavity in the central section of the seal body between the main lug portion and the secondary lug segment in facing relationship to the vent membrane unit, said main lug portion and the secondary lug segment each being of relative lengths and located in positions such that the main lug portion and the secondary lug segment are movable relatively toward and away from each other in opposite directions while remaining in tight sealing contact with the vent membrane unit in the installed position of the seal as the vent membrane unit cycles in and out during use of the apparatus.

23. Sanitary overpressure relieving apparatus as set forth in claim 22, wherein said central section of the seal is provided with a unitary, elongated, transversely extending projection engaging the vent membrane unit outboard of the relief area defining slots therein.

24. Sanitary overpressure relieving apparatus as set forth in claim 23, wherein said central section of the seal is provided with cavities on opposite sides of the projection allowing compression of the projection in opposite directions during in and out cycling of the vent membrane unit.

25. Sanitary overpressure relieving apparatus as set forth in claim 22, wherein said seal includes a tail portion, said frame structure being provided with outer and inner frame sections, said frame sections having a series of openings therein for receiving securing devices interconnecting the frame sections, one of the frame sections having flanges surrounding respective openings for limiting the degree of compression of the tail portion of the seal.

26. Sanitary overpressure relieving apparatus as set forth in claim 22, wherein said frame structure is provided with outer and inner frame sections, and a rigid spacer between the frame sections for limiting compression of the central section of the seal.

27. A seal for sanitary overpressure relieving apparatus having frame structure presenting opposed surfaces receiving the peripheral portion of a vent membrane unit therebetween wherein the vent membrane unit is provided with a series of slots adjacent the frame structure defining a relief area of the vent membrane unit, said seal adapted to be positioned between the vent membrane unit and one of the frame structure surfaces in sealing relationship thereto and comprising:

an elongated flexible one piece body having a central section configured to be generally aligned with the relief area defining slots in the vent membrane unit when the seal is installed between the vent membrane unit and said one frame structure surface, a main lug portion unitary with the central section of the seal body and projecting therefrom in a direction to sealingly engage the vent membrane unit inwardly of the relief area defining slots with respect to the frame structure, a secondary lug segment unitary with the central section of the seal and located outboard of the main lug portion and inboard of the relief area defining slots in disposition to engage the vent membrane unit in the installed position of the seal, there being an elongated, longitudinally extending cavity in the central section of the seal body adjacent the secondary lug segment in facing relationship to he vent membrane unit in disposition to communicate with the slots defining said relief area of the vent membrane unit, said secondary lug segment having inwardly-extending surfaces facing the cavity presenting an undercut area of the lug segment, said undercut area communicating with said cavity whereby when a vacuum is imposed on the surface of the vent membrane unit opposite the seal, lowering of the pressure in the cavity via the relief area defining slots causes increased pressure of the lug against the opposed surface of the vent membrane.

28. A seal for sanitary overpressure relieving apparatus as set forth in claim 27, wherein said central section of the seal has a unitary, elongated, transversely extending projection situated to engage the vent membrane unit outboard of the relief area defining slots therein in the installed position of the of the seal.

29. A seal for sanitary overpressure relieving apparatus as set forth in claim 28, wherein said cavity in the central section is located between the projection and the secondary lug segment.

30. A seal for sanitary overpressure relieving apparatus as set forth in claim 14, wherein said inner leg portion end extremity including an undercut area communicating with said cavity and facing said projection.

* * * * *